A. SUNDH.
POWER TRANSMITTING MECHANISM.
APPLICATION FILED FEB. 23, 1911.
1,010,976.
Patented Dec. 5, 1911.
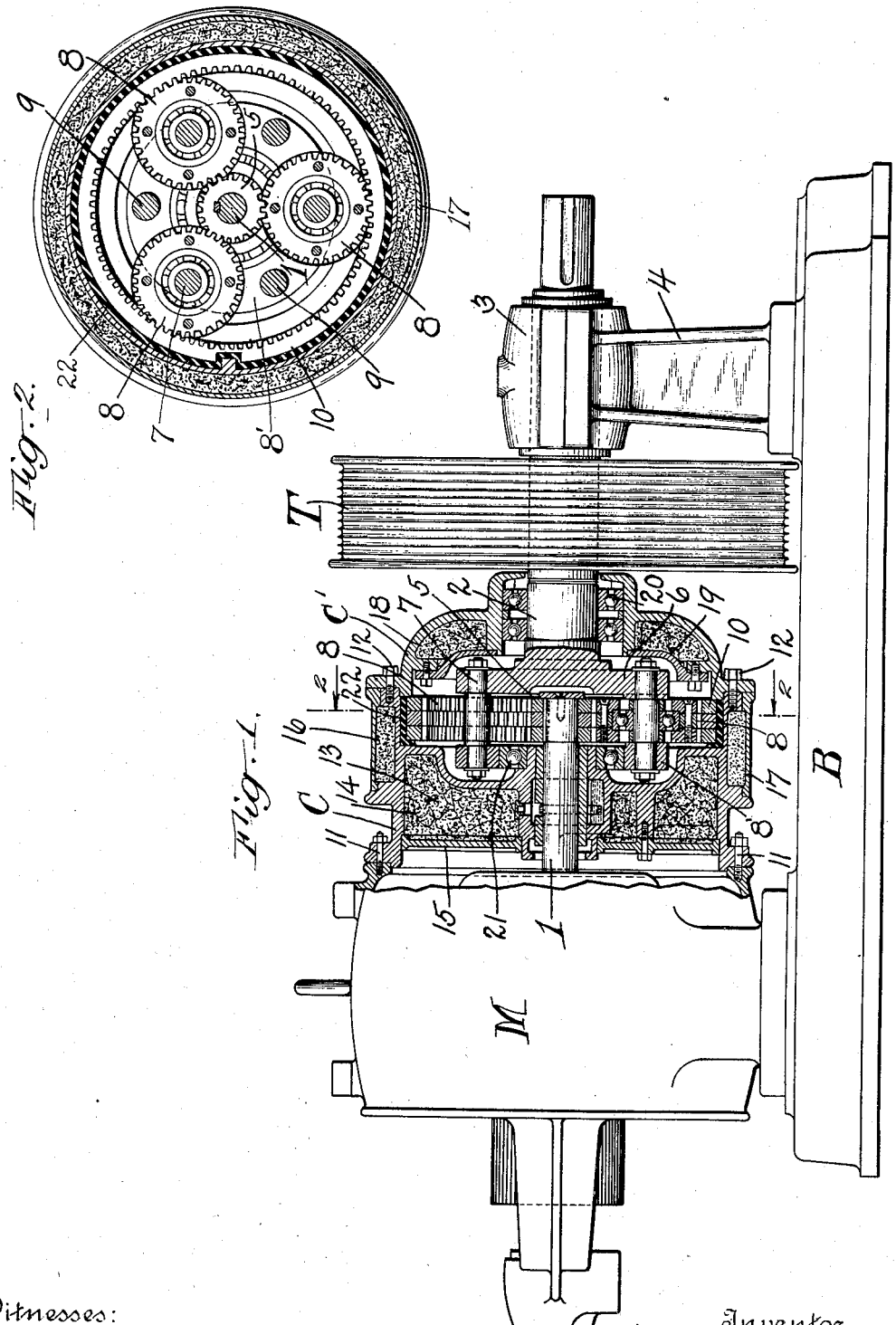

UNITED STATES PATENT OFFICE.

AUGUST SUNDH, OF HASTINGS, NEW YORK, ASSIGNOR TO OTIS ELEVATOR COMPANY, OF JERSEY CITY, NEW JERSEY, A CORPORATION OF NEW JERSEY.

POWER-TRANSMITTING MECHANISM.

1,010,976. Specification of Letters Patent. Patented Dec. 5, 1911.

Application filed February 23, 1911. Serial No. 610,232.

*To all whom it may concern:*

Be it known that I, AUGUST SUNDH, a citizen of the United States, residing at Hastings, in the county of Westchester and State of New York, have invented a new and useful Improvement in Power-Transmitting Mechanism, of which the following is a specification.

My invention relates to mechanism for transmitting power between a driving member and a driven member by means of spur gears arranged to operate the driven member at a different speed from that of the driving member.

An object of the invention is to provide a smooth-running spur gear mechanism for the above purpose which shall have a high efficiency and in which the wear is reduced to a minimum.

Another object of the invention is to arrange the mechanism so that the noise will be reduced and to provide in combination with the gearing means for deadening the noise and rendering the mechanism practically silent even when the gears are running at a high speed.

In the engineering art various forms of mechanism have been employed to effect a reduction or increase in speed of power driven mechanism. For example in the elevator art the use of noiseless chains, worm gears, friction driving belts, and spur gears, are all well known. I have found in practice that a noiseless chain runs well but may break and cannot be depended on; worm gears give a low efficiency and the relative speed obtained by their use is confined within comparatively narrow limits; friction driving mechanism is unsatisfactory largely on account of the rapid wear; leather belting moreover can only be used where ample space is available and where a positive driving connection is not essential; spur gears form practically a positive driving connection and give a high efficiency if properly designed and arranged and have the advantage that the speed may be varied to any desired degree. The principal objection to this form of gearing as in common use is the excessive noise especially where the machinery is run at a high speed.

The present invention aims to overcome the objectionable features above noted and to provide a form of mechanism in which spur gears may be employed and at the same time a smooth drive obtained and the objectionable noise of such gears practically overcome.

The exact nature of the invention and the specific objects sought to be obtained will appear more fully hereinafter.

Referring to the accompanying drawing, Figure 1 is a part sectional elevation of power transmitting mechanism constructed in accordance with the principles of my invention; Fig. 2 is a sectional view as indicated by the line 2—2 of Fig. 1.

As herein shown an electric motor M is employed as a source of power. The motor shaft 1 is connected through intermediate gearing presently to be described to a driven shaft 2 on which is mounted a traction sheave or drum T. The shaft 2 is journaled in a bearing 3 carried by a standard 4. The latter and also the motor M are mounted on a suitable base or bedplate B. Keyed to the drive shaft 1 is a series of spur gears 5 placed side by side on the shaft, and arranged with their gear teeth in staggered relation. In this instance three such gears are shown, although any other suitable number might be employed. The inner end of the shaft 2 is provided with a head 6 substantially in the form of a disk and to which are secured bearing shafts 7. On each of the shafts 7 is mounted a series of spur gears 8 in mesh with the gears 5. The opposite ends of the bearing shafts 7 are connected to a ring 8. The latter may be held rigid with respect to the head 6 by means of tie-rods or bolts 9.

Surrounding the gears 5 and in mesh therewith is a series of stationary annular spur gears 10. The annular gears 10 are suitably secured within the casing comprising sections C and C'. The section C is secured to the motor frame by means of bolts 11 and the two sections of the casing are connected by means of bolts 12. The casing is made hollow and provided with suitable compartments to receive the packing of sound-deadening material 13 which may be any suitable material, such as saw dust, asbestos-fiber, or the like, which will absorb the sound vibrations and prevent the sound being transmitted from the gearing. The section C of the casing comprises a compartment 14 which is closed by an end plate 15 and an annular compartment 16 which surrounds the gearing and may be closed by a ring 17. The section C' is formed with a compartment 18 closed by an annular plate 19. Each of the said compartments is packed with a suitable material as above indicated. The ball bearings 20 are interposed between the section C' of the casing and the driven shaft 2. Ball bearings 21 are likewise provided between the ring 8 and the hub of the section C. Interposed between the annular gears 10 and the casing is a ring 22 consisting of some suitable non-resonant or sound-deadening material, such as metallic lead. This material 22 forms a convenient and practical means for securing the annular gears to the casing and at the same time preventing sound vibrations being transmitted from the gears to the casing, that is, it forms an auxiliary means in connection with the casing for reducing the noise.

I am aware that spur gears have been arranged in staggered relation in various forms of mechanism. I am aware also that the use of sound-deadening material for reducing the vibrations and noise of power transmitting mechanism is common, especially as placed underneath and forming a support for the mechanism. I do not therefore claim broadly the use either of such material in connection with power transmitting mechanism or the use broadly of gears having their gear teeth in staggered relation. The particular arrangement of the gearing however, and also the use in connection with such gearing of the surrounding casing with the packing of sound-deadening material all as set forth in the appended claims I believe to be new.

I have found by experiment with the mechanism herein disclosed that a new result is obtained, namely that the objectionable noise is practically eliminated and at the same time a smooth operation secured.

It will be understood that the driving elements may be connected to any suitable source of power, an electric motor being shown merely as an example of a suitable power device. The driven element 2 may also be connected to operate any desired mechanism. Various changes in the details and arrangement of parts might also be made within the scope of the invention. I wish therefore not to be limited to the exact construction disclosed.

What I claim as new and desire to secure by Letters Patent of the United States is:—

1. In power transmitting mechanism, the combination of a driving member, and a driven member, intermeshing spur gears connected to said members, a stationary annular spur gear surrounding and coöperating with said first-named gears, a double-walled casing inclosing the gears, sound-deadening material forming a packing between the walls of the casing, and a non-resonant material interposed between the annular gear and the casing.

2. In power transmitting mechanism, the combination of gears, bearings for the gears, a double-walled casing inclosing said gears, and sound-deadening material interposed between the walls of said casing.

3. In power transmission mechanism, the combination of intermeshing spur gears and a sound proof casing inclosing said gears, said casing comprising double walls made in sections, and sound deadening material between the walls.

In testimony whereof, I have signed my name to this specification in the presence of two subscribing witnesses.

AUGUST SUNDH.

Witnesses:
 JOHN F. RULE,
 JAMES G. BETHELL.